P. KRUSE.
DEVICE FOR GRIPPING CANS AND THE LIKE.
APPLICATION FILED JULY 9, 1912.
1,058,373.
Patented Apr. 8, 1913.
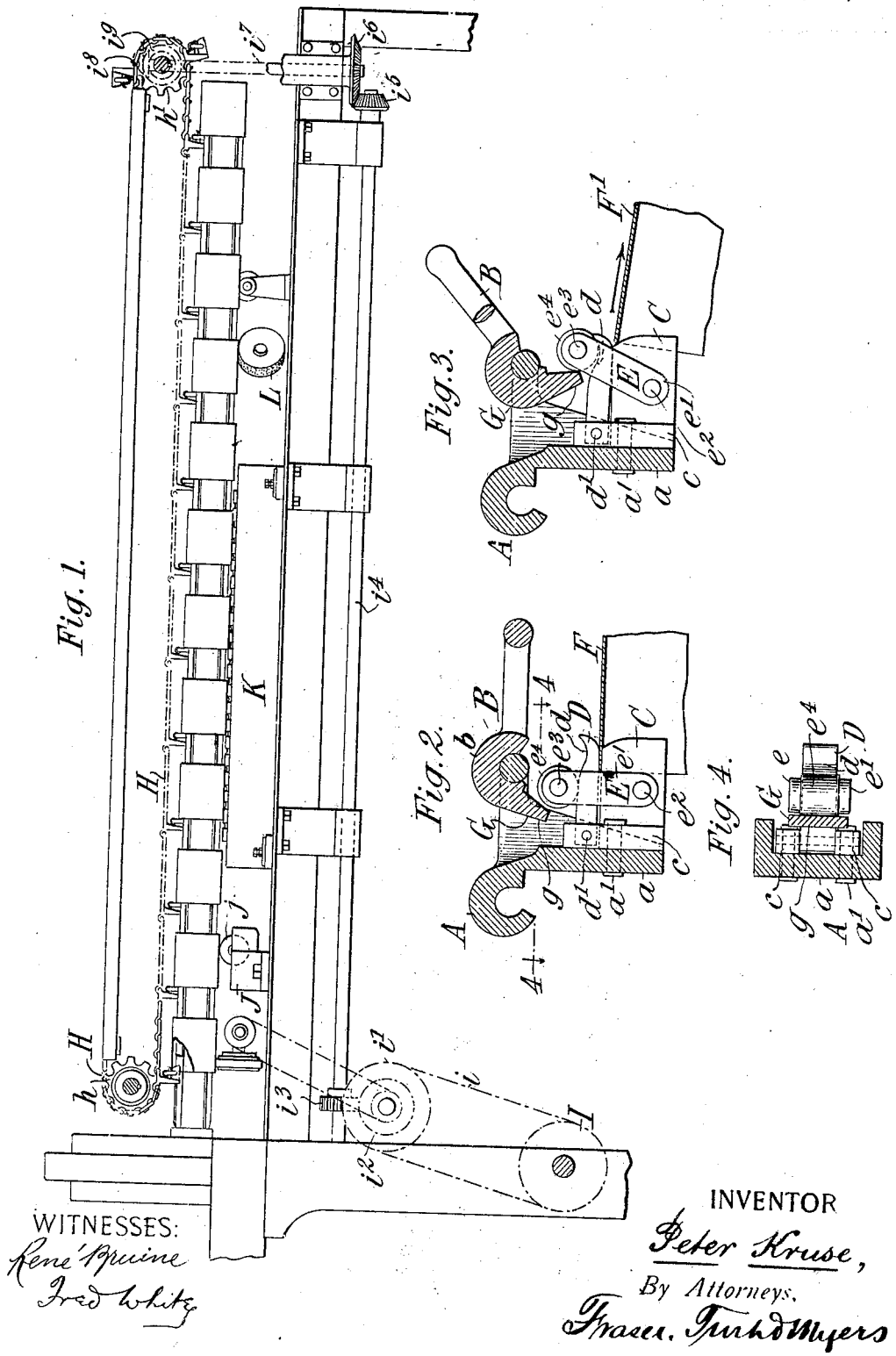
INVENTOR
Peter Kruse,
By Attorneys.
WITNESSES:

UNITED STATES PATENT OFFICE.

PETER KRUSE, OF NEW YORK, N. Y., ASSIGNOR TO E. W. BLISS COMPANY, OF BROOKLYN, NEW YORK, A CORPORATION OF WEST VIRGINIA.

DEVICE FOR GRIPPING CANS AND THE LIKE.

1,058,373.  Specification of Letters Patent.  Patented Apr. 8, 1913.

Application filed July 9, 1912. Serial No. 708,457.

*To all whom it may concern:*

Be it known that I, PETER KRUSE, a citizen of the United States, residing in the borough of Brooklyn, county of Kings, city and State of New York, have invented certain new and useful Improvements in Devices for Gripping Cans and the Like, of which the following is a specification.

My invention relates to gripping devices for gripping cans and the like, such as thin metal plates or sheets, and will be found particularly useful in connection with machines wherein the gripping device is employed as a traveling carrier for carrying cans or similar articles while the same are being treated, such for instance as by having solder applied thereto.

The invention has for its object to provide a simple gripping device which shall with certainty seize and firmly hold the can or like article while it is being fed through the machine and treated, and which shall automatically discharge the said can or other article at the desired point.

My invention consists in a traveling gripping device which is embodied in a continuous chain-like construction and has gripping jaws which are suitably gripped upon the article to be held, and in providing automatically acting releasing devices; further, in constructing said gripping devices as jaws which are closed by the insertion of the article to be gripped through the instrumentality of a pivoted dog which is hit by said article on insertion and has an arm which clamps the jaws together; further, in providing a trip for releasing the dog which is attached to a part of the chain preceding the gripping device, upon the turning of which the trip releases the dog thereby releasing the jaws and ejecting the can or other device.

A desirable manner of constructing my invention and one way in which the same may be used, is illustrated in the accompanying drawings, wherein,—

Figure 1 is a side elevation of a portion of a machine for soldering cans illustrating my invention applied thereto; Fig. 2 is a detail longitudinal section of one of my improved gripping devices illustrating the parts in gripping position after the insertion of a can; Fig. 3 is a similar view illustrating the operation of the releasing mechanism in ejecting the can; Fig. 4 is a section on the line 4—4 of Fig. 2 looking down.

I have illustrated my invention as embodied in a traveling carrier comprising links A B. Upon link A the gripping devices are mounted, and upon link B the releasing devices are contained. The gripping devices comprise jaws C D which are illustrated as relatively movable one to the other. In the preferred construction illustrated the jaw C is a fixed jaw, and the jaw D is pivotally supported and has a very slight movement relative to jaw C, this movement being just about sufficient to permit the easy insertion and ejectment of a can. The said jaws are caused to be gripped by reason of a dog E which is pivotally supported relative to the jaws so as to lie across the path of the incoming can F. As illustrated the dog E has two legs $e$ $e^1$ which are mounted upon a pivot $e^2$ which passes through the fixed jaw C. Upon their outer end said legs are connected by an arm $e^3$ pivoted thereto upon the periphery of which is a roller $e^4$.

As the can F is inserted between the jaws C D it will strike the legs $e$ $e^1$ of the dog and will force the same rearwardly, causing the arm $e^3$ and its roller $e^4$ to pinch or bind the jaws tightly together, thereby firmly gripping the can. The can will be held in this gripped position during its travel through the machine, and will be discharged by the releasing means at the desired point. The said releasing means comprises a trip or releasing arm G which is mounted upon or integral with the hub $b$ of link B. The toe $g$ of the said trip normally lies just at the rear of the roller $e^4$, and during the time the links are traveling in a horizontal position, the said trip will not affect the gripping devices. Upon the arrival however at the end of the travel, the link B will be tilted or turned as illustrated in Fig. 3 whereupon the trip G will hit against the rear side of the dog, causing the same to ride forward, thereby permitting the jaws to open and releasing the can which is ejected by the legs $e$ $e^1$ of the dog. This is clearly illustrated in Fig. 3, where F¹ illustrates the can which has just been ejected. The movable jaw D is preferably made with a channel $d$ upon its upper surface which extends transversely thereof from one side to the other. This channel is preferably of a contour to fit the roller $c^4$, although not necessarily so. By reason of said channel when the can is being ejected and the dog is thrown forward by the trip G to its extreme forward position, the movable dog D is permitted to release the can $F^1$. Without the said channel this position of the dog would cause the said can to be again gripped.

A convenient manner of constructing the gripping device is illustrated. Here the link A has a pendant flange or frame $a$, and to this is riveted the fixed jaw C by rivets $a^1$ which are passed through some suitable part of the said jaw, as for instance through side flanges $c$. These side flanges are illustrated as extending above the body of the dog C on each side and form posts through which may pass the pivot $d^1$ for the movable dog D.

The particular machine with which I have illustrated my invention, is one designed to apply solder to the can seam, and is a machine of the general type illustrated in my Patent No. 1,050,956, dated January 21, 1913. The gripping devices however illustrated in said patent are omitted, and in place thereof my improved gripping devices are substituted. Here the chain composed of a succession of links A B which as a whole is lettered H, is supported upon sprockets $h$ $h^1$ which are moved from a pulley I through belt $i$, pulley $i^1$, worm $i^2$ $i^3$, shaft $i^4$, bevel gears $i^5$ $i^6$, shaft $i^7$ and bevel gears $i^8$ $i^9$. To this machine the cans as F $F^1$ may be fed by hand or by any suitable feeding means, as for instance the means illustrated in my said patent. The particular construction of this machine or the manner of feeding the cans thereto, do not form part of this present invention.

In the machine illustrated in Fig. 1, the cans having been suitably fed to the machine and gripped between the jaws C, D, are exposed to an acid bath from tank J through roller $j$. They are then treated by having solder applied thereto from tank K, as for instance by the roll illustrated in my said patent, and they are then brushed if desired by a brush L. The cans are then conveyed by the carrier H to the end thereof which is the right hand end of Fig. 1, whereupon the link B will assume the position illustrated in Fig. 3, in passing around the sprocket $h^1$, whereupon the trip G will throw the dog E forward. As the dog passes forward its roller $e^4$ will pass into the channel $d$ upon the upper surface of dog D, permitting the jaws C D to separate as the legs $e$ $e^1$ of the dog eject the can $F^1$.

It will be seen that my invention is not limited to employment with cans, as it might equally well be used with other shapes of thin metal plates, nor is it limited in its employment to the particular machine in connection with which I have illustrated it.

The purpose of this is merely to show one desirable use of the invention. Therefore although I have described with great detail the particular construction of the various parts of my invention, the invention is not necessarily limited to such particular details of construction, as the same may be changed and other and equivalent devices substituted, within the limits of the appended claims.

I claim as my invention:—

1. A gripping device comprising a pair of jaws capable of relative movement, a locking dog pivotally mounted at one side of said jaws and an arm thereon overlapping one of said jaws, said dog lying in the path of the article to be gripped and adapted to be moved by the entrance of said article between said jaws and to cause said jaws to grip said article.

2. A gripping device comprising a pair of jaws capable of relative movement, a locking dog pivotally mounted at one side of said jaws and an arm thereon overlapping one of said jaws, said dog lying in the path of the article to be gripped and adapted to be moved by the entrance of said article between said jaws and to cause said jaws to grip said article, and releasing means pivotally mounted in said device adapted to move said dog forward, thereby releasing said jaws and ejecting the gripped article.

3. A traveling carrier having a device thereon for gripping cans or the like comprising a pair of jaws, a dog pivotally mounted in one of said jaws and having a leg extending across the path of the entering can and adapted to be moved thereby and to cause the jaws to grip said can.

4. A device for gripping cans or the like comprising a pair of jaws, a dog pivotally mounted in one of said jaws and having a leg extending across the path of the entering can and adapted to be moved thereby and to cause the jaws to grip said can, and releasing means pivotally mounted in said device adapted to move said dog forward thereby releasing said jaws and ejecting the can.

5. A device for gripping cans or the like comprising a fixed jaw and a movable jaw having a transverse channel in its upper surface, a dog pivotally mounted in said fixed jaw and having an arm extending over the upper surface of the movable jaw, said dog extending across the path of the entering can and adapted to be moved thereby and to cause the jaws to grip said can.

6. A device for gripping cans or the like comprising a fixed jaw and a movable jaw having a transverse channel in its upper surface, a dog pivotally mounted in said fixed jaw and having an arm extending over the upper surface of the movable jaw, said dog extending across the path of the entering can and adapted to be moved thereby and to cause the jaws to grip said can, and a releasing device pivotally mounted in said gripping device and adapted to move said dog forward, thereby causing said arm to pass into said channel releasing said can and causing the can to be ejected by the dog.

7. A traveling device for gripping cans or the like comprising a plurality of links pivotally connected, a pair of relatively movable jaws connected to one of said links, a dog pivotally supported by said link at one side of said jaws, an arm on said dog overlapping one of said jaws, said dog adapted to be moved by the incoming can and to grip the jaws thereon.

8. A traveling device for gripping cans or the like comprising a plurality of links pivotally connected, a pair of relatively movable jaws connected to one of said links, a dog pivotally supported by said link at one side of said jaws, an arm on said dog overlapping one of said jaws, said dog adapted to be moved by the incoming can and to grip the jaws thereon, and a trip mounted upon one of said links and lying at the rear of said arm and adapted as the link turns to throw said dog forward releasing the grip and ejecting the can.

9. A traveling device for gripping cans or the like comprising a plurality of links pivotally connected, a frame depending from one of said links, a fixed jaw mounted therein, a movable jaw pivotally mounted in said frame, a dog at the side of said jaws and pivotally mounted in one of them and having an arm extending over the other jaw, said dog adapted to be moved by the incoming can and to grip the jaws thereon.

10. A traveling device for gripping cans or the like comprising a plurality of links pivotally connected, a frame depending from one of said links, a fixed jaw mounted therein, a movable jaw pivotally mounted in said frame, a dog at the side of said jaws and pivotally mounted in one of them and having an arm extending over the other jaw, said dog adapted to be moved by the incoming can and to grip the jaws thereon, and a trip mounted upon one of said links and lying at the rear of said arm and adapted as the link turns to throw said dog forward releasing the grip and ejecting the can.

11. A traveling device for gripping cans or the like comprising a plurality of links pivotally connected, a frame depending from one of said links, a fixed jaw mounted therein, a movable jaw pivotally mounted in said frame, a dog at the side of said jaws and pivotally mounted in said fixed jaw and having an arm extending over the movable jaw, said movable jaw having a transverse channel adapted to receive said arm, and the free end of said jaw extending beyond the path of movement of said dog and serving to retain same, said dog adapted to be moved by the incoming can and to grip the jaws thereon.

12. A traveling device for gripping cans or the like comprising a plurality of links pivotally connected, a frame depending from one of said links, a fixed jaw mounted therein, a movable jaw pivotally mounted in said frame, a dog at the side of said jaws and pivotally mounted in said fixed jaw and having an arm extending over the movable jaw, said movable jaw having a transverse channel adapted to receive said arm, and the free end of said jaw extending beyond the path of movement of said dog and serving to retain the same, said dog adapted to be moved by the incoming can and to grip the jaws thereon, and a trip mounted upon one of said links and lying at the rear of said arm and adapted as the link turns to throw said dog forward releasing the grip and ejecting the can.

13. A traveling device for gripping cans or the like comprising a plurality of links, a pair of relatively movable jaws mounted in one link, a dog pivotally mounted in one of said jaws and lying at both sides thereof, an arm carried by said dog and extending across the other jaw, said dog adapted to be moved by the incoming can and to grip the jaws thereon.

14. A traveling device for gripping cans or the like comprising a plurality of links, a pair of relatively movable jaws mounted in one link, a dog pivotally mounted in one of said jaws and lying at both sides thereof, an arm carried by said dog and extending across the other jaw, said dog adapted to be moved by the incoming can and to grip the jaws thereon, and a trip mounted upon one of said links and adapted as its link turns to move said dog releasing the grip and ejecting the can.

15. A traveling device for gripping cans or the like comprising a plurality of links, a fixed jaw mounted in one link and a movable jaw pivotally mounted therein, a dog pivotally mounted in the fixed jaw and having a leg at each side thereof, and an arm connecting said legs and extending across the movable jaw, a roller on said arm, said movable jaw having a transverse channel near its free end, said dog adapted to be moved by the incoming can and to grip the jaws thereon.

16. A traveling device for gripping cans or the like comprising a plurality of links, a fixed jaw mounted in one link and a movable jaw pivotally mounted therein, a dog pivotally mounted in the fixed jaw and having a leg at each side thereof, and an arm connecting said legs and extending across the movable jaw, said movable jaw having a transverse channel near its free end, said dog adapted to be moved by the incoming can and to grip the jaws thereon, and a trip mounted upon one of said links and adapted as its link turns to move said dog forward whereby its arm passes over said channel releasing the grip and its legs eject the can.

17. A traveling gripping device for cans and the like comprising a continuous chain composed of connected links, gripping devices carried at intervals by said chain each comprising a pair of gripping jaws and a pivoted dog lying in the path of the incoming can and adapted to close the gripping jaws thereon, and a trip carried by a preceding link and adapted as said link turns to move said dog and open the jaws and eject the can therefrom.

18. A traveling gripping device for cans and the like, comprising a continuous chain composed of connected links, gripping devices carried at intervals by said chain each comprising a fixed gripping jaw, a movable gripping jaw having a transverse channel in its upper surface near its free end, a dog pivoted in said fixed jaw, and lying in the path of the incoming can, and having an arm overlying the movable jaw and adapted to be moved thereby and to cause the jaws to grip the can, and a trip carried by a preceding link and adapted as said link turns to move the dog and to cause said arm to lie over said channel whereby the jaws are open and said dog is caused to eject said can.

19. A traveling gripping device for cans and the like having gripping jaws and means whereby said jaws are closed by the incoming can, and releasing means pivoted thereto and adapted to release said jaws as the said releasing means turns on its pivot.

20. A traveling gripping device for cans and the like having gripping jaws and a pivoted dog actuated by the incoming can and adapted to grip said jaws thereon, and releasing means pivoted thereto and adapted to release said dog as the said releasing means turns on its pivot and to permit the jaws to open and to cause said dog to eject the can from said jaws.

21. A traveling gripping device for cans and the like, constructed in the form of a continuous chain, having pivotally connected links, gripping jaws connected to one link thereof, and means whereby said jaws are gripped on the incoming can actuated by said can, and releasing means attached to a preceding link and adapted to release said jaws as the said link turns on its pivot.

22. A traveling gripping device for cans and the like constructed in the form of a continuous chain, gripping jaws connected to one link thereof, and a movable dog moved by the incoming can and adapted to cause the jaws to grip thereon, and a trip attached to a preceding link in the chain and adapted to move the dog, thereby releasing the jaws and to eject the can therefrom.

In witness whereof, I have hereunto signed my name in the presence of two subscribing witnesses.

PETER KRUSE.

Witnesses:
  WALTER THOMA,
  FREDK. C. FLADD.